(12) United States Patent
Rooney (10) Patent No.: US 6,401,774 B1
(45) Date of Patent: Jun. 11, 2002

(54) OFF-ROAD TIRE HAVING PUNCTURE PREVENTING PADS

(75) Inventor: Timothy Michael Rooney, Munroe Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 105 days.

(21) Appl. No.: 09/599,466

(22) Filed: Jun. 22, 2000

(51) Int. Cl.⁷ .................. B60C 11/11; B60C 107/02; B60C 115/00; B60C 121/00
(52) U.S. Cl. ............... 152/209.12; 152/209.15; 152/209.19; 152/209.28
(58) Field of Search ............ 152/209.12, 209.13, 152/209.15, 209.19, 209.28, DIG. 1

(56) References Cited

U.S. PATENT DOCUMENTS

| | | | |
|---|---|---|---|
| D168,494 S | * 12/1952 | Beckman | |
| 4,446,902 A | * 5/1984 | Madea et al. | 152/209.12 |
| 4,687,037 A | * 8/1987 | Pfeiffer et al. | 152/209.28 |
| 4,711,283 A | * 12/1987 | Bonko et al. | 152/209.12 |
| D308,038 S | * 5/1990 | Guidry | |
| 5,259,429 A | * 11/1993 | Harms | 152/209.12 |
| 5,375,639 A | * 12/1994 | Suzuki et al. | 152/209.28 |
| 5,375,640 A | * 12/1994 | Harms | 152/209.12 |
| 5,417,269 A | * 5/1995 | Kinoshita et al. | 152/209.19 |
| 6,021,829 A | * 2/2000 | Rooney | 152/209.12 |

FOREIGN PATENT DOCUMENTS

| | | | |
|---|---|---|---|
| FR | 1163341 | * | 9/1958 |
| FR | 2201193 | | 4/1974 |
| GB | 1 236 335 | | 6/1971 |
| GB | 2 021 049 A | | 11/1979 |
| JP | 58-152604 | * | 9/1983 |
| JP | 10-119516 | * | 5/1998 |

* cited by examiner

Primary Examiner—Steven D. Maki
(74) Attorney, Agent, or Firm—David L. King (57) ABSTRACT

This invention relates to off-road tires, more specifically, a preferred embodiment of this invention relates to a pneumatic all-terrain vehicle tire having puncture prevention pads 72.

7 Claims, 6 Drawing Sheets

OFF-ROAD TIRE HAVING PUNCTURE PREVENTING PADS

TECHNICAL FIELD

This invention relates to off-road tires, more specifically, a preferred embodiment of this invention relates to a pneumatic all-terrain vehicle tire.

BACKGROUND OF THE INVENTION

As used in this patent the term off-the road tires means pneumatic tires that have a primary use or working surface condition that is not on a paved road. Such tires include earthmover, agricultural tires, lawn and garden tires, and all-terrain vehicles tires, including, but not limited to off-road dirt bike tires and ATV tires.

Of particular interest are tires that have low operating pressures and minimal belt reinforcements. Tires in this class include farm tires or ATV tires. ATV tires generally operate at less than 10 psi and often times have no belt reinforcing structure.

All-terrain vehicles are relatively lightweight with a relatively low center of gravity. Early three wheel versions had knobby tires having small square block elements and a relatively shallow tread depth.

Later versions of "Quad runners" or 4-wheel type ATV's were developed and have been more widely accepted due to their improved stability. Horsepower increases and improvements in both vehicle suspension and chassis has resulted in vehicles capable of relatively high speed and much greater load carrying capacity.

The tires used on these vehicles are operated at very low pressures in the 0.7 bar 10 psi or less range. The tires are very wide with relatively large air chambers, which assist in absorbing shock and vibration. The tires generally have nominal rim diameters of 36 cm 14 inches or less and overall diameters of 69 cm 27 inches or less.

Often the rear tires are of a slightly larger size than the more lightly loaded front tires.

In aggressive off-the-road applications, the tires must have a very open tread pattern that employs elongated lugs which provide effective straight-line or drawbar traction to enable the vehicle to climb hilly and rough terrain, as shown in U.S. Design Pat. No. 308,038. Additionally, the tread must provide excellent lateral traction for vehicle stability during turning maneuvers as is disclosed in U.S. Pat. No. 5,259,429.

The tire disclosed in that patent employs a repeating pattern of long, intermediate length and short lugs arranged to provide improved traction. The arrangement of these lugs is such that each lug wraps completely over the tread shoulder portion. The lugs are also circumferentially relatively closely spaced such that numerous lugs are in the footprint of the tire at any one time. The tire made according to this prior art invention is considered one of the best mud tires in its class according to its manufacturer.

In wet soils with heavy clay content there is a tendency for the tread to pack with mud between the elongated lugs. The circumferential space between the adjacent lugs is commonly referred to as a soil discharge channel. The channels extend generally from the centerplane of the tread axially outwardly over the tread shoulder. Once this area is packed with mud, the tread effectively looses its ability to provide any traction. This is because the lugs are buried in the packed mud giving the tire the appearance of a slick or racing tread devoid of grooves.

For the very reasons these tires have such good traction capabilities, they exhibit a relatively high potential for stubble damage in the area of the inner tread surface. This thin inner tread surface lies between the tread lugs and sharp objects such as the rocks, sticks, thorns or roots can penetrate this undertread causing the tire to deflate.

It is an object of the present invention to minimize this type of tire damage without increasing tire weight or losing tire performance.

A further objective of the present invention is to maintain the tread pattern, which is self-cleaning in wet clay soil conditions.

It is still a further objective that the tread design maintain its good handling and traction performance on firm soils without any penalties in tire weight.

SUMMARY OF THE INVENTION

An off-road tire having a casing and a tread radially outward of the casing is disclosed. The tread has an inner tread and a plurality of lugs extending radially outward from the inner tread.

The tread has a plurality of elongated pads, each elongated pad is oriented in a direction substantially parallel to the centerlines of circumferentially adjacent lugs. Each pad has a base width Z as measured from the inner tread and a radial height X also being measured from the inner tread. Z is at least three times greater than X. Each longitudinal sidewall has a slope of 30° or less as measured from the inner tread surface, preferably about 20° or less. The radial height is less than 0.2 inches (5 mm).

The elongated pads each have a pair of tapered ends extending across the sides. The tapered ends are inclined at an angle of about 45° or less relative to the inner tread surface.

In some cases whether there is a substantial circumferential space between adjacent lugs, it may be desirable to further include a radially outer or flat surface interposed between the pair of sloped longitudinal sides.

In the most preferred embodiment of the invention the off-road tire is an ATV tire. This ATV tire has the tread having the lugs arranged in an array of lugs oriented in a repeating directional pattern. The arrays are in rows around the circumference of the tread. A first array of lugs extends angularly from an axially inner end adjacent the centerplane (EP) of the tread toward a first lateral edge terminating an axially outer end. A second array of tread lugs extends angularly from an axially inner end adjacent the centerplane of the tread towards the second lateral edge terminating at an axially outer end. The space between each pair of first or second circumferentially adjacent arrays of lugs defines a soil discharge channel. Each pair of first or each pair of second arrays of lugs has the elongated pad located within the soil discharge channel and interposed between circumferentially adjacent arrays. The elongated pad is inclined in a direction similar to the inclination of the pairs of respective arrays.

Preferably the elongated pad interposed between circumferentially adjacent pairs of arrays is located substantially equal distance between centerlines of adjacent arrays. Each array of lugs has at least one circumferentially extending open channel between a pair of lugs within each array. At least one open channel intersects the soil discharge channel. It is believed desirable that the elongated pads have a length L of at least 35% of the tread arc width. Preferably the elongated pad extends from an axially inner end adjacent the equatorial plane outward to a lateral end covering substantially all of the soil discharge channels length.

The all terrain vehicle tire of the present invention preferably has a net-to-gross ratio of the tread as measured between the lateral edges around the entire circumference of the tread of less than 35%.

DEFINITIONS

"All-terrain Vehicle ATV" is any motorized off-highway vehicle 50 inches 1270 mm or less in overall width, with an unladen dry weight of 600 lbs. 275 kg or less, designed to travel on four or more low pressure tires, having a seat designed to be straddled by the operator and handlebars for steering control, and intended for use by a single operator and no passenger. Width and weight shall be exclusive of accessories and optional equipment. ATV's are subdivided into four categories as follows:

Category G General Use Model ATV: An ATV intended for general recreational and utility use;

Category S Sport Model ATV: An ATV intended for recreational use by experienced operators only;

Category U Utility Model ATV: An ATV intended primarily for utility use.

Category Y Youth Model ATV: An ATV intended for recreational off-road use under adult supervision by operators under age 16. Youth model ATV's can further be categorized as follows:

Category Y-6 ATV: A Category Y-6 ATV is a youth model ATV which is intended for use by children age 6 and older.

Category Y-12 ATV: A Category Y-12 ATV is a youth model ATV which is intended for use by children age 12 and older.

"Aspect Ratio" means the ratio of its section height to its section width.

"Axial" and "axially" means the lines or directions that are parallel to the axis of rotation of the tire.

"Belt or Breaker Structure" or "Reinforcing Belts or Breakers" means at least two annular layers or plies of parallel cords, woven or unwoven, underlying the tread, unanchored to the bead, and having both left and right cord angles in the range from 17° to 35° with respect to the equatorial plane of the tire.

"Bias Ply Tire" means that the reinforcing cords in the carcass ply extend diagonally across the tire from bead-to-bead at about a 25–65° angle with respect to the equatorial plane of the tire, the ply cords running at opposite angles in alternate layers.

"Carcass" means a laminate of tire ply material and other tire components, excluding the tread and any belt reinforcements, these additional components may be added to the carcass prior to its being vulcanized to create the molded tire.

"Equatorial Plane EP" means the plane perpendicular to the tire's axis of rotation and passing through the center of its tread.

"Inner" means toward the inside of the tire and "outer" means toward its exterior.

"Outer" means toward the tire's exterior.

"Pneumatic tire" means a laminated mechanical device of generally toroidal shape usually an open-torus having beads and a tread and made of rubber, chemicals, fabric and steel or other materials. When mounted on the wheel of a motor vehicle, the tire through its tread provides traction and contains the fluid that sustains the vehicle load.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height" SH means the radial distance from the nominal rim diameter to the outer diameter of the tire at its equatorial plane.

"Section Width" SW means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that portion of a tire between the tread and the bead.

"Tread" means a molded rubber component which when, bonded to a tire casing, includes that portion of the tire that comes into contact with the road when the tire is normally inflated and under normal load.

"Tread Width or Tread Arc Width" means the arc length of the tread surface in the axial direction, that is, in a plane parallel to the axis of rotation of the tire.

DETAILED DESCRIPTION OF THE INVENTION

Figure 1:
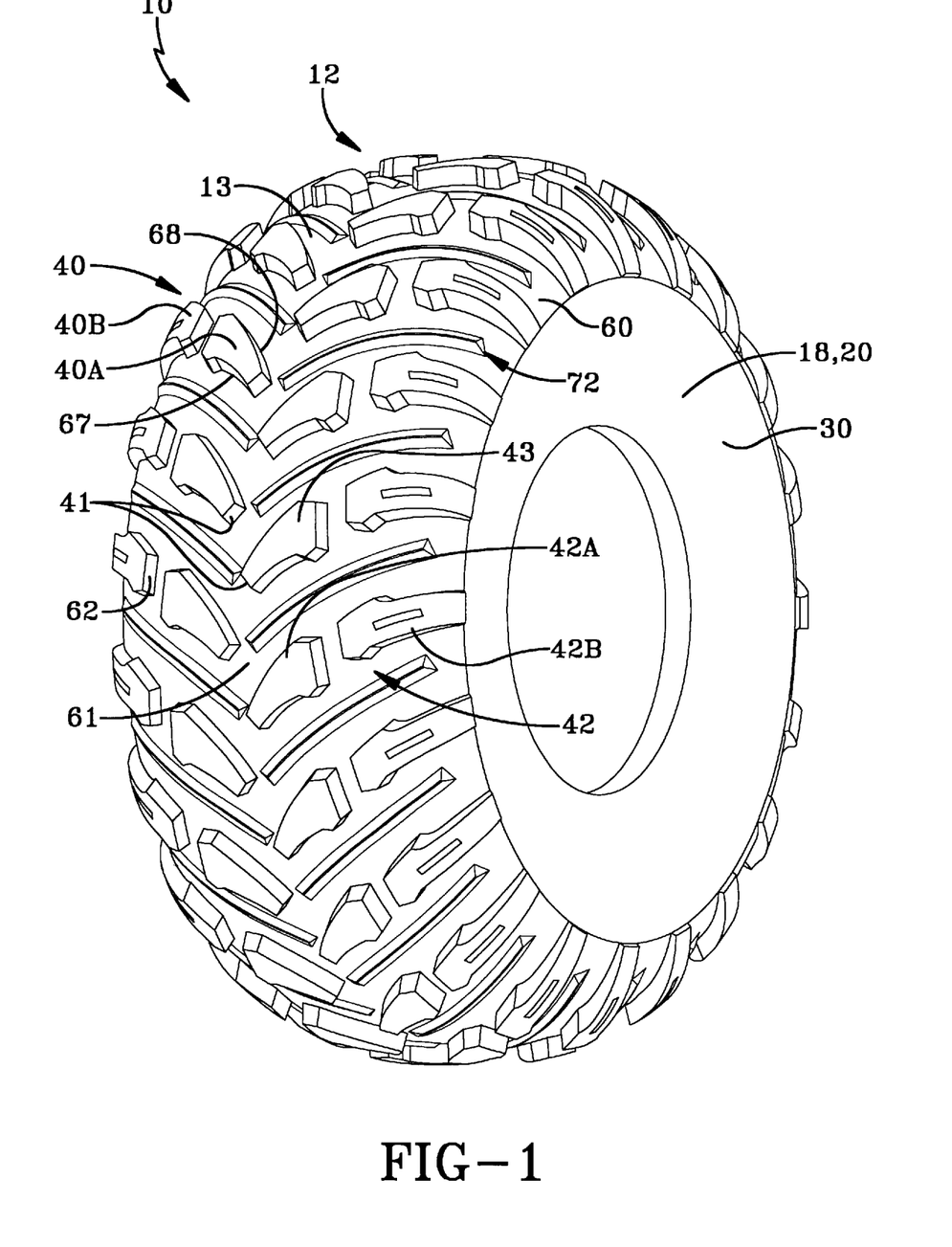
FIG. 1 is a perspective view of the preferred tire according to the invention.

With reference to FIG. 1 the preferred off-road tire 10 according to the present invention is illustrated. The tire 10 shown is an ATV tire which has a nominal rim diameter of 36 cm (14 inches) or less; a carcass 30, a tread 12 disposed radially outward of the carcass.

The reference numerals as depicted in the drawings are the same as those referred to in the specification. For purposes of this application, the various embodiments illustrated in FIGS. 1–6 each use the same reference numerals for similar components.

The tread 12 has an inner tread 13 and a plurality of elongated lugs 40, 42 each lug 40,42 having an axially inner portion 40A,42A and an axially outer portion 40B,42B extending radially outward of the inner tread 13.

Figure 3:
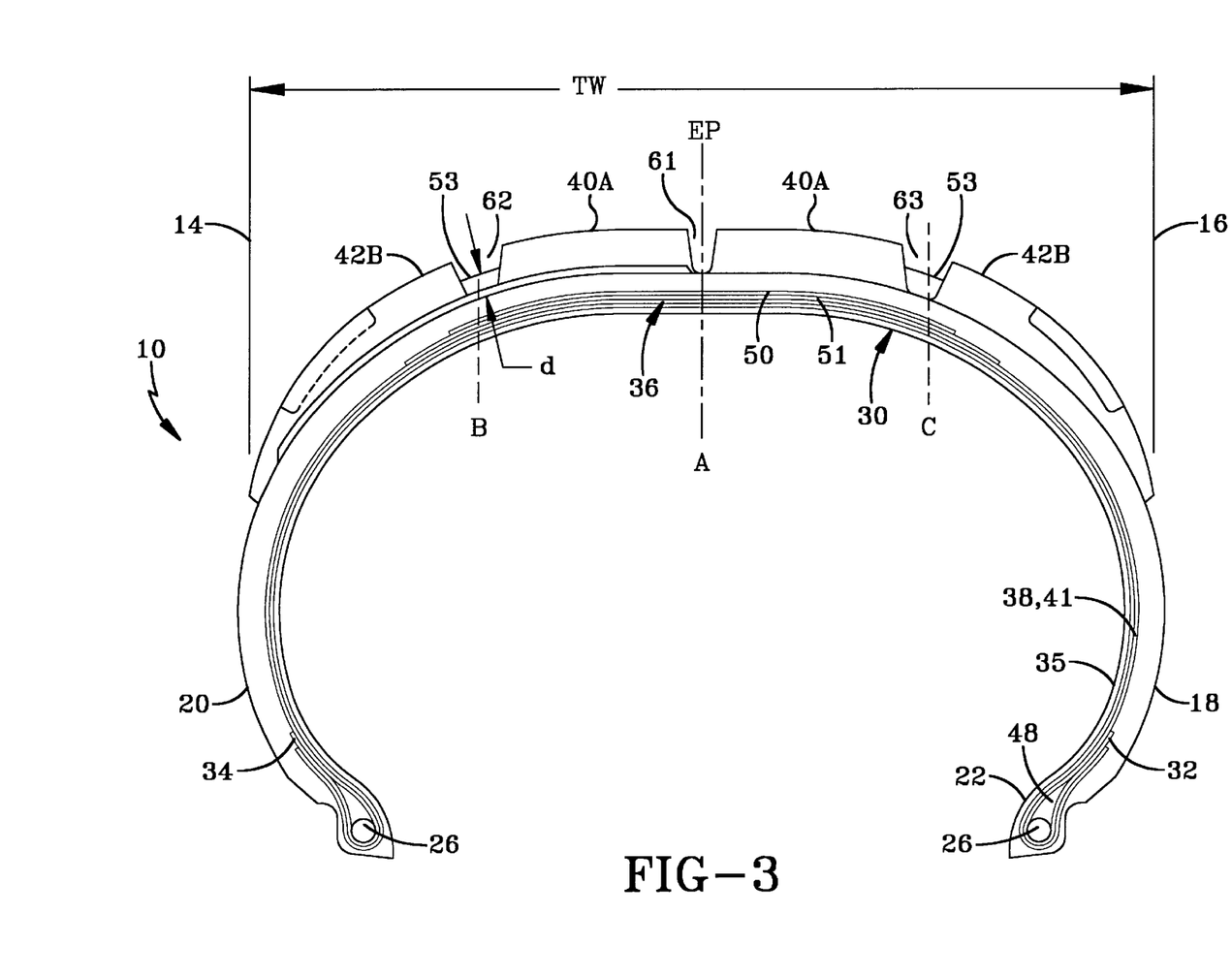
FIG. 3 is a cross-sectional view of the tire taken from FIG. 2.

Referring to FIG. 3, a cross-sectional view of the preferred tire 10 is shown.

The tire 10 according to the present invention is an ATV tire. The tire 10 is provided with a ground-engaging tread portion 12, which terminates in the shoulder portions at the lateral edges 14,16 of the tread 12. Sidewall portion 18,20 extends from tread lateral edges 14, 16 respectively and terminates in a pair of bead regions 22 each having an annular inextensible bead core 26 respectively. The tire 10 is further provided with a carcass 30 which has a reinforcing ply structure 38 which extends from bead region 22 through sidewall portion 18, tread portion 12, sidewall portion 20 to bead region 22. The turn-up ends 32,34 of ply structure 38 are preferably wrapped about bead cores 26 respectively. The tire 10 may include a conventional innerliner 35 forming the inner peripheral surface of the tire 10, if the tire is to be of the tubeless type. One pair of tread reinforcing belt or breaker structures 36 may optionally be placed circumferentially about the radially outer surface of reinforcing ply structure 38 beneath tread portion 12. In the particular embodiment illustrated, breaker structures 36 each comprises two cut breaker plies 50,51 and the cords of breaker plies 50,51 are oriented at an angle of 25° to 35° with respect to the midcircumferential centerplane of the tire.

The cords of breaker ply 50 are disposed in an opposite direction to the midcircumferential centerplane and from that of the cords of breaker ply 51. However, the belt or breaker structures 36 if used in the ATV tire may comprise any number of belt or breaker plies of any desired configuration and the cords may be disposed at any desired angle. Belt or breaker structures 36 provide lateral stiffness across the belt width so as to help minimize lifting of the tread from the road surface during operation of the tire as well as providing puncture resistance. In the embodiment illustrated, this can be accomplished by making the cords of belt or breaker plies 50,51 of nylon or similar synthetic material.

It must be appreciated that the employment of a belt or breaker structure can have detrimental effects on ride and handling and, therefore, in many applications the use of such features may be undesirable for a particular ATV vehicle. Furthermore, these belt 10 or breaker structures may be desirable on the front tires or the rear tires but not both the front and rear tires. One of ordinary skill in the tire art can easily appreciate when such components should be employed and when they should be avoided.

The tire illustrated in FIG. 3 shows the carcass 30, which has at least one reinforcing ply structure 38. The reinforcing ply structure 38 has at least one ply layer of cords 41 for a radial ply tire, the cords 41 being oriented at an angle in the range of 65° to 90° relative to the equatorial plane and the structure 38 for a bias tire has at least two ply layers of cords 41, the cords of each adjacent layer being equal but oppositely oriented at an angle of 25° to 65° with respect to the equatorial plane of the tire.

Figure 2:
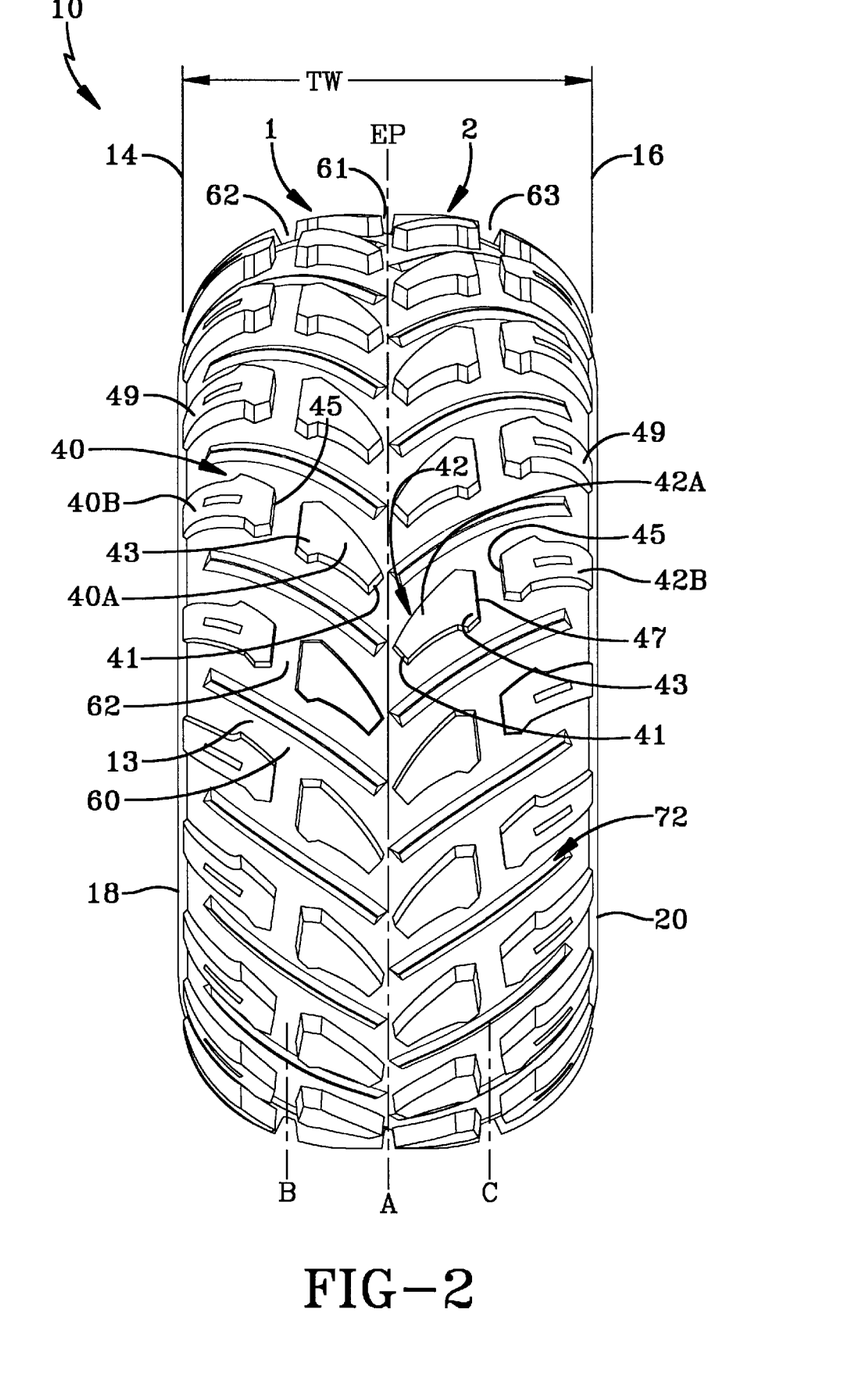
FIG. 2 is a plan view of the tire of FIG. 1.
Figure 4:
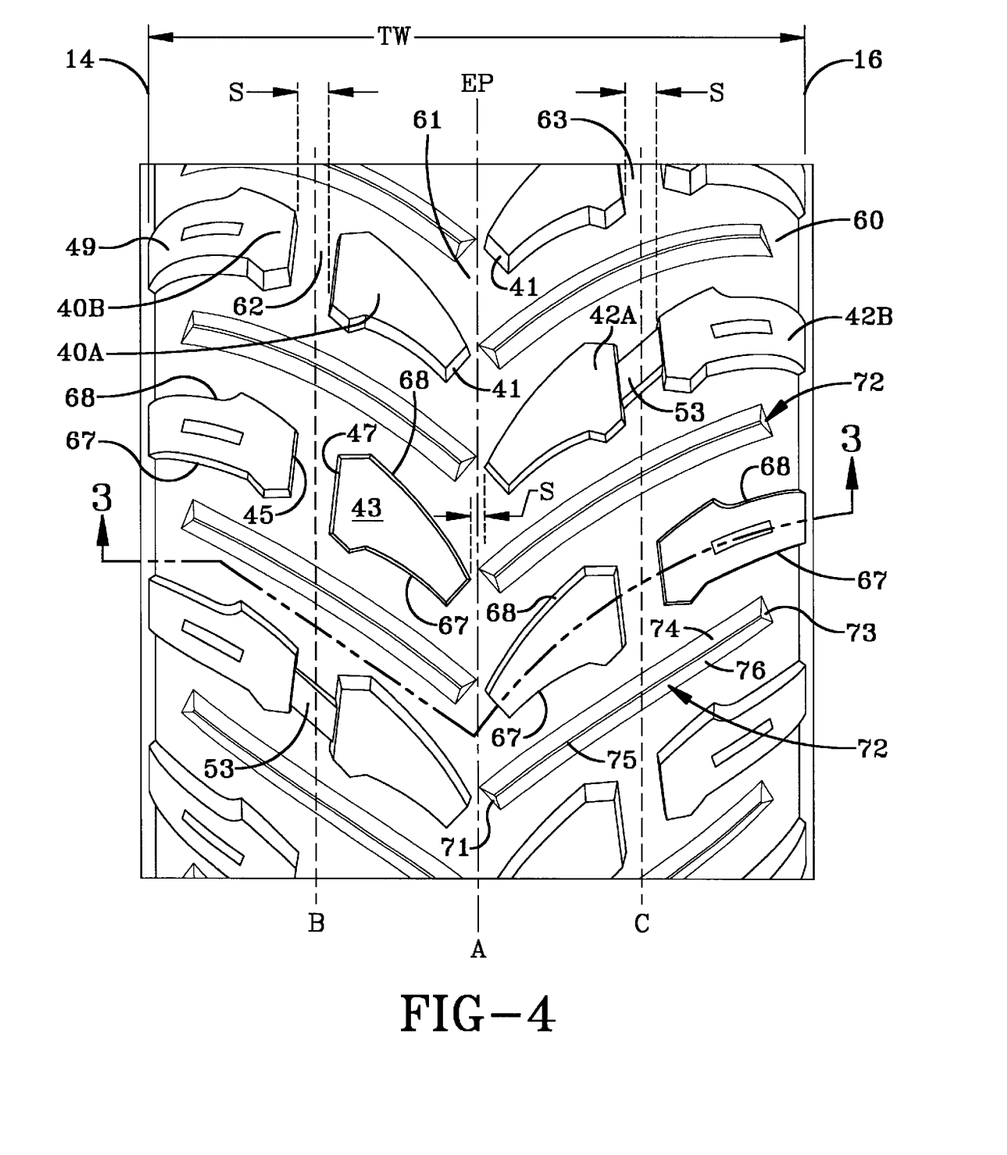
FIG. 4 is an enlarged fragmentary view of the tire of FIG. 1.

Referring to FIGS. 2 and 4, a plan view of the tire 10 and an enlarged fragmentary portion of the tread 12 is shown respectively.

The lateral edges 14,16 are defined as planes perpendicular to the tire axis of rotation R and intersecting the axially outermost portions of the elongated lugs 40,42 in the shoulder regions. The distance between the lateral edges defines the tread arc width and the tread width. The distance halfway between the lateral edges is the equatorial centerplane EP of the tire 10. The tread 12 has elongated lugs 40,42 extending radially outward from the inner tread 13. Each lug 40,42 has a leading edge 67 and a trailing edge 68. Preferably, the leading and trailing edges are curved.

The lugs 40,42 are arranged into two circumferentially repeating rows 1,2. The first and second rows 1,2 extend laterally outwardly from the center of the tread 12 to a respective tread lateral edge 14,16. The first row preferably is circumferentially offset relative to the second row.

Figure 6:
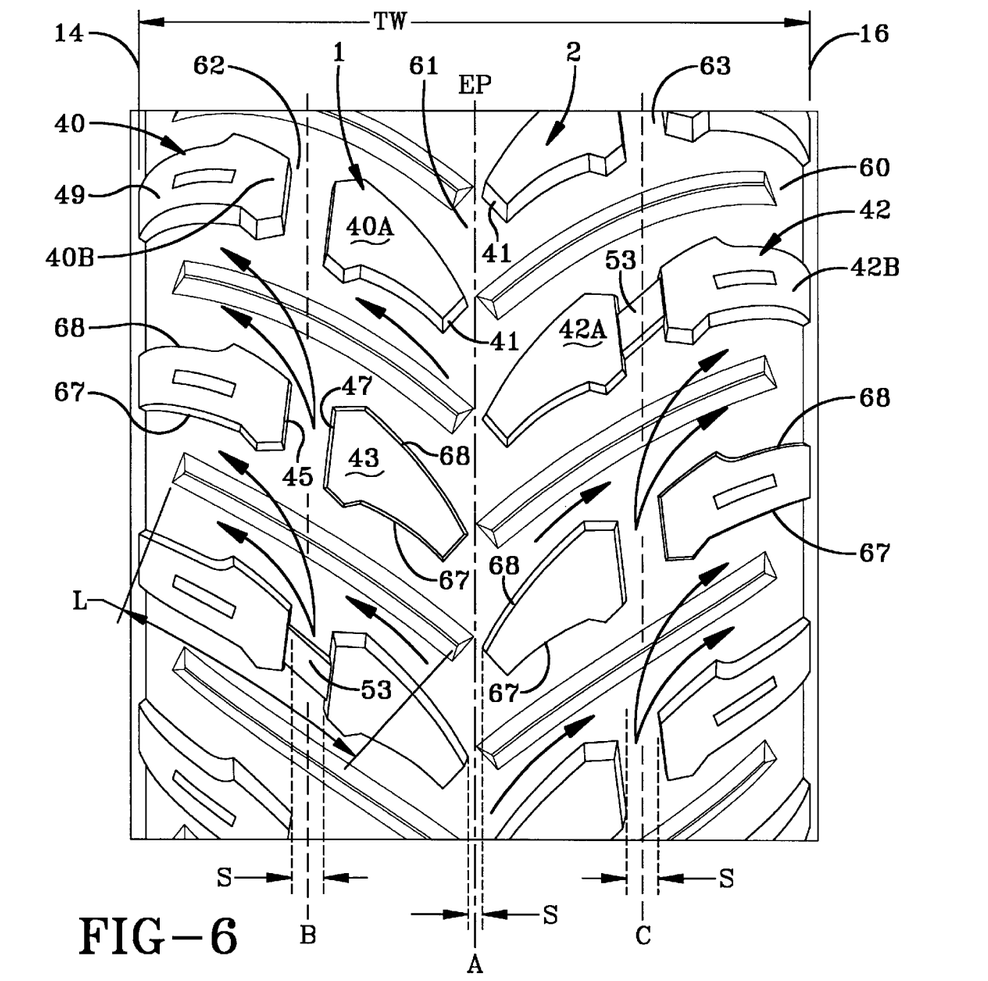
FIG. 6 is a soil discharge flow pattern of a footprint of the tire of FIG. 1.

As shown in FIG. 6, volumetric space above the inner tread 13 between the circumferentially adjacent lugs 40,42 of the first and second 1,2, form soil discharge channels 60 extending from the central portion of the tread 13 axially outwardly to a tread shoulder. Each soil discharge channel 60 is opened to both circumferentially adjacent soil discharge channel 60 via a circumferentially continuous open channel at an axially inner location 61 at the tread centerplane, and is opened to both circumferentially adjacent soil discharge channels 60 via a circumferentially continuous open channel at an axially outer location 62. The channel at the axially inner location 61 and the channel at the axially outer location 62 as illustrated are aligned axially around the circumference of the tread. The minimal axial width of each channel at each axially inner location 61 and each axially outer location 62 is in the range of 1 cm to 4 cm, preferably about 2 cm. The opening at the axially inner location 61 is between an axially inner end of an elongated shoulder lug 40 and an axially inner end of an elongated lug 42. Whereas, the channels at the axially outer locations 62 is between an axially inner portion 40A,42A and an axially outer portion 40B,42B of each elongated lug 40,42. The channels minimum opening S at the axially inner location 61 is intersected by a circumferentially extending and parallel plane A between the lugs 40,42 and by a plane B or C between the axially outermost point of the axially inner portion 40A,42A and at the axially innermost point of the axially outer portion 40B,42B of the lugs 40,42.

Preferably each lug 40,42 of the first and second row 1,2 has an enlarged circumferentially extending lug head 43 located at an axially outer end 47 of the axially inner portions 40A,42A lugs 40,42, more preferably the lug heads 43 of the rows 1,2 are respectively axially aligned and spaced from the equatorial plane. Preferably, the enlarged lug heads 43 of the lugs 40,42 of the first and second rows 1,2 are substantially aligned with the axially inner end 45 of the adjacent axially outer portion 40B,42B of the lugs 40,42. This means that the enlarged lug head 43 of the lugs 40,42 of the first and second row are axially inward of the axially outer location 62 between the lug end 45 axially outer portion 40B,42B of the lug 42.

The lugs 40,42 extend from the inner tread 13 a radial distance D of about 1.9 cm or more, preferably about 2.5 cm. This deep non-skid tread 12 is superior in traction in wet or sloppy soil conditions. The channels 60 are arranged such that as the tire 10 rotates and the lugs 40,42 enter the footprint or ground-contacting portion at least two of lugs 40 and two of lugs 42 or three soil discharge channels 60 are engaging the soil on one or both tread halves. The soil or mud is quickly expelled either axially over the shoulder or circumferentially through the channel locations 61,62,63. Furthermore, the mud cannot pack around these deep lugs 40, 42 due to the unique lug spacing and the circumferential continuous open channels at locations 61,62,63 between the soil discharge channels 60 which actually prevents mud from packing in the tread pattern as the tire 10 rotates.

An important feature of the tread 12 of the current invention of the preferred embodiment tire is the circumferentially extending enlarged lug heads 43. These features enhance the ride of the tire 10 when the ground is firm by insuring that there is a sufficient lug contact with the road to prevent these tall lugs 40,42 from squirming as they enter or leave the tire's footprint or contact patch as the tire rotates. Additionally, as can further be observed from the drawings the lugs 40,42 are arranged such that at least two lugs on the tread are in contact along a one-inch wide axial band at any circumferential location of the tread as measured from tread shoulder to opposite tread shoulder. That is, if one draws a one inch wide band axially across the tread the band will intersect at least two lugs, preferably the band width is substantially less than one 15 inch.

These features make the driver feel that he has a large amount of tread in contact with the road surface when in fact only a very small percentage of the contact patch is in road contact.

This tread according to the invention has less than 33% of the tread area contacting a paved surface, preferably as shown about 25%.

Unlike farm tires which travel at speeds of less than 25 miles per hour. This ATV tire must be capable of speeds close to 50 mph. At such speeds the lugs must work in concert to prevent harsh vibrations from being created, which could cause ride problems. This tread pattern reduces these vibrations to permit the tire to be operated as high speed. This is made possible by the shape and the orientation of the lugs as shown. Each lug 40,42 has a somewhat inclined axially inner portion 40A,42A as well as a more lateral inclination of the axially outer portion 40B,42B, which enhances the tire's traction performance. As shown the outer portions 40B,42B each have a narrow slot or groove 70 to further enhance traction. The inner portions 40A,42B having a narrow axially inner end, which progressively widens toward the enlarged lug head 43. This narrow end between the leading edges 67 and trailing edges 68 is designed to penetrate the soil due to the reduced axial width. Once the end penetrates the soil the leading edge 67 curves to a more lateral inclination giving an increased biting edge. The inclined axially inner portions 40A,42B provides a tremendous amount of traction improvement, while the axially outer portions 40B,42B provide additional increased forward traction due to the lateral inclination.

Figure 5:
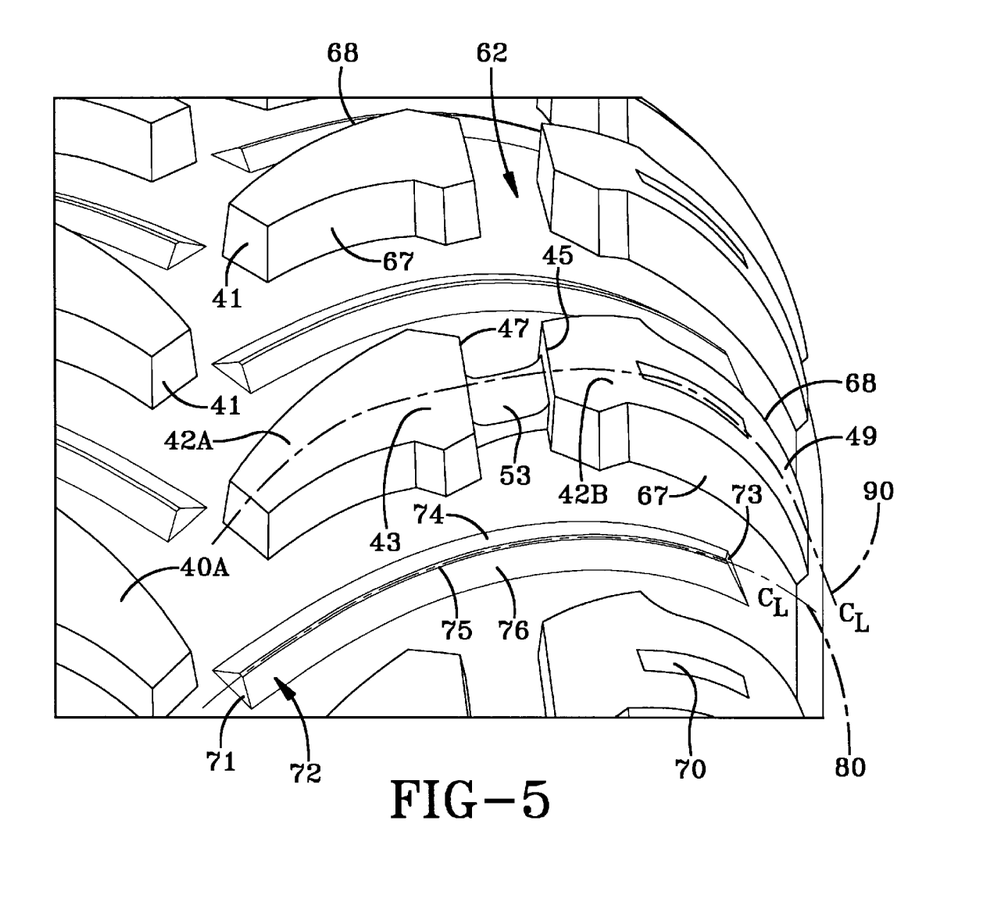
FIG. 5 is an alternative lug and block construction for the tire of FIG. 1.

As further illustrated in FIG. 5, the locations 62 do not have to extend full depth as shown in the preferred embodiment tire of FIGS. 1, 2, 3, 4 and 6. The space between the axially inner portion 40A,42A and the axially outer portion can be bridged by a tie bar 53 of a reduced depth. It is believed important that this connection 53, between the lug portions, should leave an opening having a depth of at least 50% of the lug depth D for the circumferentially continuous open channel soil flow characteristics to be maintained. Lesser amounts of opening are believed to be too restrictive in terms of flow and therefore less desirable.

As is readily apparent the circumferentially continuous open channels as shown in the plan view of FIG. 2, has an opening having a minimum axial width of S. This minimum opening width is preferably at least 1 cm, more preferably at least 2 cm. Ideally this minimum opening axial width S in each lug 40,42 of the first or second row is axially aligned around the circumference of the tire. That is the minimum opening width S in each channel can be intersected by a parallel plane A,B, or C that is parallel to the centerplane of the tread. This means that the three circumferential channels 61,62,63 need not have the minimum openings axially aligned around the circumference of the tread 12 as shown, but at a minimum these openings should be such that a plane A,B, or C would intersect each opening. Ideally the contact patch as measured on a hard surface has the outer channels in the interior of the patch so that at least a portion of the axially outer lug portions 40B,42B are in the contact patch. As shown these axially outer openings are located within the lateral extremes of the contact patch because if they are positioned too close to the shoulder of the tread, they have almost no assistance in tread cleaning through the channels 61,62,63.

As shown, the opening at location 62 can alternatively be almost of a constant width but in that case the opening should have a minimum axial spacing S of about 1–2 cm or greater to insure that soil can rapidly flow through the opening.

As the tire rotates in wet clay type soils the channels provide flow paths that push into the soil discharge channels 60. Because the three circumferentially continuous open channels 61,62,63 provide an unobstructed path in the circumferential direction, the mud is thrown out the back of the tire as the footprint clears the ground thus leaving three open circumferential channels 61,62,63. These channels 61,62,63 actually helps clean the mud between the circumferentially adjacent lugs 40,42 by allowing water/moisture to get under the mud and dissolve it from the bottom up as well as from the top down. In very wet conditions the circumferential channels 61,62,63 tend to pump water into the soil discharge channels 60 actually washing the soil out of the channels.

With reference to FIGS. 1, 2, 4, 5, 6, and 7 elongated pads 72 are shown extending radially outwardly from the inner tread 13. Each elongated pad 72 is located within a soil discharge channel 60 and lies between a pair of circumferentially adjacent lugs or arrays of lugs. If lug portions 40A and 40B are considered in array of lugs oriented in a directional pattern and inclined relative to the equatorial plane, then the elongated pad is oriented in a direction similar to a pair of arrays as illustrated in FIG. 1. Interestingly, the elongated pad has a centerline 80. The centerline 90 of the array is substantially parallel to the centerline of the elongated pad. As further shown, the elongated pad is approximately positioned equal distance from each circumferentially adjacent array of lugs. It is believed important that the elongated pad have a length that is sufficient to extend almost completely across the soil discharge channel as it extends outward over the tread shoulder. This insures that the elongated pad provides sufficient puncture protection from stubble in the entire footprint area of the tread as the tire rotates. It is noted that the longitudinal sides 74, 76 of the elongated pad 72 are sloped at an angle of 30° or less relative to the inner tread 13. It is believed preferable that the sloped sides 74,76 are inclined at an angle of 20° or less to insure that the stubble debris is easily deflected outward and does not hang up on the puncture pad. The 20° or less sloped sides 74,76 of the pads 72 also allow the pad to be very wide and thus protect a larger section of the tire undertread 13 located between tread lugs 40,42. The pad 72 can either come to a point at the top forming a line along the entire length L of the pad 72 or the pad 72 can have a flat area 75 forming a plane along the length L of the pad. The flat surface 75 should be of minimum width $P_w$ of 0.20 inches (5 mm) or less so as not to inhibit the deflection capability of the pad 72. Each pad 72 preferably has taper ends 71,73 inclined at an angle of 45° or less.

As can be seen the elongated pads traverse almost the entire length of the discharge channel 60 insuring that when arrays of lugs are employed, the puncture pads 72 traverse at least one of the circumferential opening 61,62,63.

Figure 7:
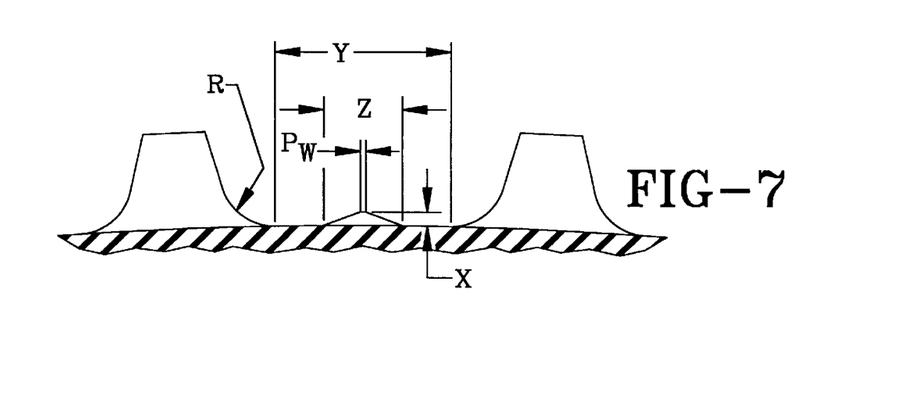
FIG. 7 is a cross-sectional view of a soil discharge channel.

As shown in FIG. 7 each elongated pad 72 has a base width Z as measured from the inner tread 13 and a radial height X as measured relative to the inner tread 13. The elongated pad 72 preferably has the base width Z being at least three times, preferably six times greater than the radial height X. It is believed desirable that the radial height X should be less than two-tenths of an inch (5 mm). This insures that the longitudinal pad 72 is sufficiently low not to adversely impact the soil discharge capability of the tread 12. In smaller ATV tires it has been found that as low as a 0.1 inch or 2.5 mm height X is sufficient to dramatically reduce stubble damage. By utilizing dimensions as shallow as 0.2 inches (5 mm) it has been determined that no additional tread rubber is needed to form these elongated pads 72 in each soil discharge channel 60. This is made possible by the molding technique where uncured tread rubber is applied to the outside of the carcass and during the vulcanization process the tread lugs and the inner tread surface are formed. It has been found through experiments that the inner tread surface 13 has a higher thickness of tread rubber trapped between the adjacent lug causing a nonuniform undertread thickness, this increase in rubber thickness has been repositioned with regard to the tires of the present invention such that the excess rubber now forms the elongated pads 72 creating a beneficial effect that otherwise heretofore was unavailable.

With reference to FIG. 7 a cross-sectional view of the elongated pad 72 is shown interposed between circumferentially adjacent lugs. As can be seen, the sides of the lugs have a generous radius R as the lug approaches the inner tread surface 13. This radius R is considered the bracing of the tread lug and has been used to prevent cracks along the inner surface 13 and is further used to facilitate molding. As can be seen in cross-section this radius R creates a sufficiently large mass of rubber near the base of each lug such that penetration of stubble is minimal adjacent these braced lugs. On the other hand at the inner tread in the center where the elongated pad 72 is strategically positioned it is noted that a similar increase in rubber mass has occurred. The total width of the pad should occupy at least 50% of Y which is the distance between the lug radii R. This increase in rubber mass with the sloping sides helps deflect debris that impinges on the tire surface so that the debris cannot penetrate through the inner tread surface. As mentioned above, the elongated pads also place the excess rubber between lugs in the most advantageous locations to prevent punctures and abrasions. In the past stone penetration protectors have been used in the basic grooves of truck tires and the like to prevent stones from impinging or being trapped between closely spaced lugs and to prevent these trapped stones from drilling their way through the inner tread of a truck tire. In the case of the ATV tires, it is important that these elongated penetration pads are employed to prevent debris such as roots, sticks, thorns, rocks or other sharp objects from penetrating through the relatively thin undertread of the tire. As noted, the elongated pads are oriented at an angular inclination similar to the orientation of the lugs thus lying within the soil discharge channel and being substantially parallel to the centerlines of the lugs. This insures that as the soil and debris flows outwardly over the elongated pads 72 between adjacent lugs, the pads 72 themselves will create no obstruction to the flow of the soil/debris over the tread. The small radial height of these pads also insures that circumferential soil flow is not obstructed. In many prior art tires, small shallow buttons are used as debris deflectors. The small buttons have a tendency to snag branches, thorns and roots and provide a place to introduce a location for penetration. This is true because the small perturbances are not sufficiently sloped such that the debris easily deflects over them. Rather they are designed with sufficiently tall surfaces with inadequate sloping such that they actually block the debris from freely traversing over the penetration protectors. These conical buttons also prevent the soil from flowing freely through the discharge channel causing potential lug clogging. In one prior art farm tire small transverse debris deflecting protrusions are located between adjacent lugs. These features are oriented so that they do not lie in the same direction as the flow path as the soil being transmitted over the tread shoulders and they provide additional edges to snag debris. The elongated shallow pads 72 of this invention being shaped and oriented provides a most beneficial feature at virtually no cost to the end user.

What is claimed is:

1. An off-road ATV tire having a nominal rim diameter of 14 inches or less, a casing and a tread radially outward of the casing, the tread has an inner tread and a plurality of lugs, each lug having laterally inclined centerlines and extending radially outwardly from the inner tread, the tread comprises:

a plurality of elongated pads, each elongated pad being oriented in a direction substantially parallel to the centerlines of circumferentially adjacent lugs, each pad having a base width Z as measured from the inner tread and a radial height X, Z being at least three times greater than X, wherein the radial height X of the elongated pad is less than the radial height of the lugs and each elongated pad has a pair of longitudinal sides, each longitudinal side having a slope of 30° or less as measured from the inner tread surface and a pair of tapered ends extending across the sides, the tapered ends being inclined at an angle of 45° or less relative to the inner tread surface, each elongated pad has a length L of at least 35% of the tread arc width.

2. The off-road tire of claim 1 wherein the radial height X is less than 0.2 inches (5 mm).

3. The off-road tire of claim 1 wherein the longitudinal sides are sloped at an angle of 20° or less as measured from the inner tread surface.

4. The off-road tire of claim 3 wherein each pad has a radially outer surface interposed between the pair of sloped longitudinal sides.

5. The off-road tire of claim 1 wherein the lugs are arranged in arrays of lugs oriented in a repeating directional pattern, the arrays being in rows around the circumference of the tread, a first array of lugs extends angularly from an axially inner end adjacent the centerplane (EP) of the tread toward a first lateral edge terminating at an axially outer end, a second array of tread lugs extends angularly from an axially inner end adjacent the centerplane (EP) of the tread towards the second lateral tread edge terminating at an axially outer end, the space between each pair of first or second circumferentially adjacent arrays defines a soil discharge channel interposed between circumferentially adjacent arrays and inclined in a direction similar to the inclination of the pairs of respective arrays.

6. The off-road tire of claim 5 wherein the elongated pad interposed between circumferentially adjacent arrays is located substantially equal distant between centerlines of adjacent arrays.

7. The off-road tire of claim 5 wherein each array of lugs has at least one circumferentially extending open channel between a pair of lugs within the array, and the at least one open channel intersects the soil discharge channel.

\* \* \* \* \*